(12) United States Patent
Klassen

(10) Patent No.: US 8,749,861 B2
(45) Date of Patent: Jun. 10, 2014

(54) L*A*B* SCANNING USING RGB-CLEAR

(75) Inventor: R Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1931 days.

(21) Appl. No.: 11/863,591

(22) Filed: Sep. 28, 2007

(65) Prior Publication Data

US 2009/0086292 A1      Apr. 2, 2009

(51) Int. Cl.
*H04N 1/60*         (2006.01)
*G03F 3/08*         (2006.01)

(52) U.S. Cl.
USPC ............ 358/523; 358/1.9; 358/504; 358/518; 358/520

(58) Field of Classification Search
None
See application file for complete search history.

(56) References Cited

U.S. PATENT DOCUMENTS

| | | | | |
|---|---|---|---|---|
| 5,754,448 A * | 5/1998 | Edge et al. | | 358/516 |
| 5,877,787 A * | 3/1999 | Edge | | 347/19 |
| 6,075,888 A * | 6/2000 | Schwartz | | 382/167 |
| 6,278,533 B1 * | 8/2001 | Takemoto | | 358/521 |
| 6,330,078 B1 | 12/2001 | Wang | | |
| 6,647,140 B1 * | 11/2003 | Wang et al. | | 382/162 |
| 6,781,596 B2 | 8/2004 | Falk | | |
| 6,950,110 B2 | 9/2005 | Falk | | |
| 6,960,752 B1 * | 11/2005 | Yamaguchi | | 250/208.1 |
| 6,975,949 B2 | 12/2005 | Mestha et al. | | |
| 7,164,429 B1 * | 1/2007 | Moroney | | 345/603 |
| 7,259,768 B2 | 8/2007 | Falk | | |
| 2005/0225562 A1 * | 10/2005 | Higgins et al. | | 345/604 |
| 2007/0002403 A1 | 1/2007 | Klassen | | |

OTHER PUBLICATIONS

G. Sharma, H. J. Trussel, "Optimal Filter Design for Multi-illuminant Color Correction", Xerox Corporation, 4 pgs.
Daniel Nystrom, "Colorimetric and Multispectral Image Acquisition Using Model-Based and Empirical Device Characterization", B.K. Ersboll and K.S. Pedersen (Eds.): SCIA 2007, LNCS 4522, pp. 798-807, 2007.

* cited by examiner

*Primary Examiner* — Richard Zhu
(74) *Attorney, Agent, or Firm* — Fay Sharpe LLP

(57) ABSTRACT

Systems and methods are described that facilitate reducing metamerism in a scanner or printer system by evaluating and manipulating unfiltered clear channel information. Using a four channel model to predict CIE XYZ tristimulus values from RGB and clear, a linear model is generated based on a polynomial matrix conversion. For example, one such model has coefficients weighting 1, R, G, B, W, $R^2$, $G^2$, $B^2$, $W^2$, RG, RB, RW, GB, GW, BW, and corresponding third order terms. The XYZ values predicted by the linear model are converted to L*a*b*, and compared with measured L*a*b* values. A statistic involving the difference between measured and computed L*a*b* values is used as a metric in a non-linear optimization to obtain the best values for the matrix elements. Once the matrix is optimized, it is employed for printer calibration, error detection, and the like.

16 Claims, 3 Drawing Sheets

L*A*B* SCANNING USING RGB-CLEAR

BACKGROUND

The subject application relates to document scanning, and more particularly to scanner and printer calibration, and more particularly to mitigating metamerism in color printing and/or scanning.

Previously, scanners used only RGB or Clear: clear for grayscale scanning; RGB for color. By restricting the color set in CMYK space, RGB to L*a*b* conversions can be obtained, however some colors remain with errors greater than 2 delta-E (DE) units. One reason for poor conversions is fluorescence in the paper, causing the color to depend on the amount of paper covered, in ways that are not directly describable in a three-primary space.

Some scanners are equipped with four channels: Red, Green, Blue and Clear (RGBW). In principle, when scanning a page with only CMY used to control color, RGB would be sufficient to capture desired information, so long as the paper and toner set do not change. This principle has been exploited in scanner-based printer calibration techniques, since printer calibrations generally only use K in the absence of CMY and various combinations of CMY (without K). By characterizing the scanner separately for K and for different regions of CMY space, scanner characterizations have been obtained at 0.51 mean DE 2000, with a $95^{th}$ percentile of 1.27. However, the darkest patches tend to be beyond the $95^{th}$ percentile, with values ranging from 2.4 to 6.18. Furthermore, to obtain such values requires holding the toner set and paper fixed, and restricting the colors to those normally used in printer calibration. One reason that RGB is insufficient to completely capture CMY variation is fluorescence: as more of the page is covered, less of the detected light results from fluorescence, and the hue of the page can shift. An indication of this is the fact that the hue changes along a step wedge of any single separation.

The clear channel uses the same sensors and illuminant as the RGB channels: there is only limited information available "in the cracks." Suppose, for example, that the RGB filters were perfect block dyes, matched so that each one transmitted perfectly over a distinct sub-range of the visible, and exactly one transmitted at each wavelength in the range. In that case the RGB signals could be combined (using a weighted average) to predict the clear signal. For two reasons, the prediction is imperfect. First, the filters are not perfect block dyes. Some information is lost when sampling in RGB space, due to metamerism, and a clear channel, even though it is metameric itself, can, when combined with the RGB channels, restore some of that information. Second, when one of the three RGB channels is weak, the sensor has a low signal to noise ratio. Accordingly, there is an unmet need for systems and/or methods that facilitate overcoming the aforementioned deficiencies.

BRIEF DESCRIPTION

In accordance with various aspects described herein, systems and methods are described that facilitate calibrating a printer and/or scanner and reducing metamerism. For example, a method for reducing metamerism in a scanned document can comprise scanning a characterization page using a plurality of filtered channels and an unfiltered channel to generate R, G, B, and W values, measuring the characterization page in calorimetric space to generate measured colorimetric values, generating best fitting parameters of a conversion function from R, G, B and W values to calorimetric values, and employing the conversion function to convert scanned values from RGBW to colorimetric values. The measured calorimetric values can be L*a*b* values, and generating best fitting parameters can comprise obtaining best fitting parameters for a conversion to XYZ space. The method can further comprise converting values from XYZ to predicted L*a*b* values and refining the best-fit parameters to minimize a root-mean-square color distance (DE) between the predicted L*a*b* values and the measured L*a*b* values. Additionally or alternatively, the conversion function comprises matrix multiplication, employing a best-fit matrix. Non-linear optimization can be employed to refine the best-fit matrix, thereby minimizing a difference in L*a*b* space between measured and predicted L*a*b* values. The best-fit matrix can be a polynomial matrix and can be employed to map RGBW values to XYZ space for data fitting and scanner characterization. The method can additionally comprise employing at least one of the following values in the polynomial matrix: W, $W^2$, $W^3$, RGW, RBW, GBW, $R^2W$, $G^2W$, $B^2W$, $W^2R$, $W^2G$, and $W^2B$.

According to other features, the method further comprises optimizing the parameters for RGBW-to-XYZ conversion using parameters optimized for an RGB to XYZ conversion as a starting point. The method can additionally comprise adding zero-coefficients for unfiltered terms to the parameter set, and optimizing the zero-coefficients to obtain non-zero coefficients. The unfiltered terms can comprise W, RW, GW, BW, and $W^2$. Furthermore, the refined parameter set can be employed to convert one or more colors in subsequent scanned pages, and the converted colors can be employed to calibrate a printer and/or to measure printer drift.

According to another aspect, a system that facilitates reducing metamerism in electronic documents comprises a scanner that scans a characterization page to generate RGB values and W values, and a processor that generates best-fitting parameters of a conversion function for converting the R, G, B and W values to colorimetric values, and employs the conversion function to convert scanned values from RGBW to calorimetric values. The system further comprises a colorimeter that measures L*a*b* values for the characterization page, and the processor generates predicted L*a*b* values from XYZ values using the conversion function and refines the best-fit parameters to minimize a root-mean-square color distance (DE) between the predicted L*a*b* values and the measured L*a*b* values. The processor can employ non-linear optimization to refine the matrix and minimizes a difference in L*a*b* space between measured and predicted L*a*b* values, and wherein the best-fit matrix is a polynomial matrix and is employed by the processor to map the RGBW values to XYZ space for data fitting and scanner characterization. Additionally or alternatively, the processor employs at least one of the following color value and clear value combinations in the polynomial matrix: W, $W^2$, $W^3$, RGW, RBW, GBW, $R^2W$, $G^2W$, $B^2W$, $W^2R$, $W^2G$, and $W^2B$.

According to other features, the system further comprises a mathematical solver that optimizes coefficients for conversion to XYZ space in the matrix, wherein the processor adds non-zero coefficients for W values to the matrix, the mathematical solver optimizes the non-zero coefficients, and wherein the processor employs the refined matrix to convert one or more colors in subsequent scanned pages.

According to yet another aspect, a printing platform comprises a scanner that scans a characterization page using a plurality of sensors to generate color values and unfiltered clear values, a processor that generates best-fitting parameters of a conversion function for converting R, G, B and W values to colorimetric values, and employs the conversion function to convert scanned RGBW values into calorimetric values, and a memory that stores at least one lookup table comprising conversion data for converting between L*a*b* space, XYZ space, and color space. The processor employs a refined matrix to convert one or more colors in a subsequent scanned page, and employs the one or more converted colors to calibrate a printer.

DETAILED DESCRIPTION

In accordance with various features described herein, systems and methods are described that facilitate reducing metamerism in a printer and/or scanner by exploiting non-redundant information in a clear channel (W). For example, colors on a printed or scanned page can appear different than intended due to factors or conditions that contribute to metamerism, whereby colors with different spectral power distributions appear the same to a human eye, and colors that appear the same to one measuring device appear different to either a different device or a human eye. Systems and methods disclosed herein facilitate mitigating such metameric effects by, for a given page, scanning the page collecting data for all four channels. Data collected from all four channels is then employed to generate a model from scanner space to L*a*b* space.

Figure 1:
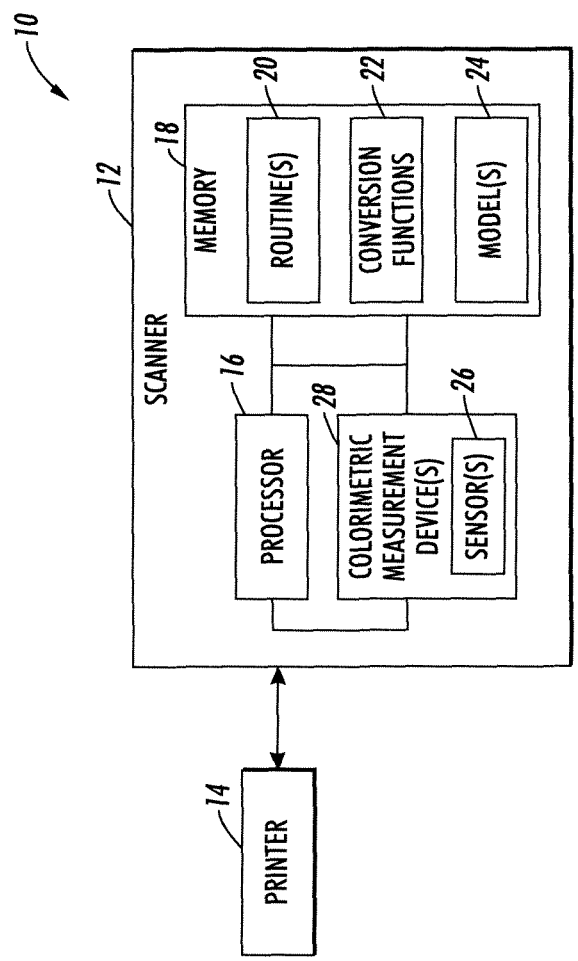
FIG. 1 illustrates a system that reduces metamerism in a scanned image and facilitates printer or scanner calibration using non-redundant information contained in a clear channel (W) of a four-channel (e.g., RGBW) scanner, in accordance with various features described herein.

With reference to FIG. 1, a system 10 is illustrated that reduces metamerism in a scanned image and facilitates printer or scanner calibration using non-redundant information contained in a clear channel (W) of a four-channel (e.g., RGBW) scanner 12, in accordance with various features described herein. The system 10 includes the scanner 10, which is coupled to a printer (e.g., a color printer), and includes a processor 14. The processor is further coupled to a memory 18, which stores one or more machine-executable routines 20 for performing the various functions and/or methods herein, as described in greater detail below. The memory 18 further comprises space dedicated to holding parameters of conversion functions 22, the functions usable for converting image data between various color models 24 (e.g., L*a*b* color space, CIE XYZ space, L*u*v* space, etc.), etc. The memory 18 can further store any other information and/or routines suitable for carrying out the various methods described herein. These functions may, for example, comprise matrix-vector multiplication, in which case the parameters are the entries in the matrix.

The processor 16 receives additional data from one or more calorimetric measurement devices 28 that sense color on a printed document. A colorimetric measurement device might, for example, be a spectrophotometer such as the X-Rite DTP70 High Speed Scanning Spectrophotometer. According to one example, the calorimetric measurement device includes approximately 5-7 sensors 26, each having a different filter for sensing a range of the visible spectrum. The sensors 26 scan a characterization page using the four channels (RGB and W), wherein the clear channel, W, is unfiltered. The colorimetric measurement devices 28 measure the same characterization page in a standardized color space such as CIE XYZ or CIE L*a*b* space.

For many purposes, it may be desirable to have a space that is approximately linear in RGB(W); CIE XYZ space is one such space; CIE L*a*b* is not. If the colorimetric measurement device or devices measure the characterization page in a non-linear space, such as CIE L*a*b*, the processor 16 converts the L*a*b* spatial measurements into XYZ space (e.g., as standardized by the International Commission on Illumination, or CIE), using one or more routines 20 and/or functions 22. Alternatively, the processor can receive previously generated and converted measurements stored in memory 18.

In one example, in which the conversion function or functions comprise matrix-vector multiplication, the processor 16 generates a best-fit matrix for transforming from RGBW space to XYZ space using well known techniques such as least squares fitting.

In another example, the conversion function comprises multiple matrices, in what is known as a moving-matrix approach. In the moving-matrix approach, multiple matrices are computed using techniques such as least squares fitting, where each matrix is optimized for a sub-region of color space. Then, when the conversion function is used, the results of multiple matrix multiplications are used and weighted according to the distance from the desired location that the subregions for the respective matrices are.

In yet another example, a multidimensional spline function provides the conversion function. In this case the control points of the spline provide the parameters that are fit, such as by using a least squares approach.

The processor 16 refines the parameters generated by the above technique using a non-linear optimization routine to minimize a difference in L*a*b* space between measured values and values converted through the conversion function from RGBW to XYZ and subsequently converted to L*a*b* space using one or more conventional techniques. The processor can build and refine multiple matrices in different portions of color space, which are then used to convert colors of subsequently scanned pages. Additionally or alternatively, the converted colors are used to calibrate the printer 14, to measure printer drift or other print defects, etc.

According to an example, to determine whether non-redundant information is present in the clear channel, an RGBW scan of $6^4=1296$ patches equally spaced in CMYK space can be performed. The W channel can be modeled by the processor 16 and stored to memory 18 using linear regression from RGB (and higher order terms), to determine how much additional information is introduced by including W or, alternatively, how much information is lost by excluding W. While the regression model for clear exhibits a high $R^2$ value, (e.g., approximately, 0.9996), the standard error can be sufficiently large that over ⅓ of the patches exhibit an error in predicting clear greater than ½ on a 0.255 scale. While this may be a relatively small number for many purposes (such as scanning documents), it is large enough to create significant errors when converted to a DE value, depending where in color space the errors occur. Accordingly, the high value of $R^2$ appears to indicate that little information is to be gained from adding clear channel information, but conversely, if a few patches are largely responsible for the large standard error, they can be isolated and improved.

Typical scanner characterizations designed for printer calibration have mean errors below 1 (DE2000), and $95^{th}$ percentiles below 1.5, but a long tail to the distribution curve, with maximum errors in excess of 6. The system 10 facilitates limiting the set of printed colors in order to reduce the effect of metamerism, thus reducing errors in the tail of the distribution curve. Scanner characterizations designed to be independent of black additions strategy generally produce substantially higher mean errors; thus the system 10 may also be employed to facilitate reducing errors in black-independent scanner characterizations.

As stated above, using the four channel model to predict CIE XYZ tristimulus values from RGB and clear facilitates mitigating occurrences of metamerism. According to an example, a linear model based on a polynomial matrix conversion is generated by the processor 16 and stored to memory 18 for use in converting image data measured by the sensors 26. For example, one such model to predict X can have coefficients weighting 1, R, G, B, W, $R^2$, $G^2$, $B^2$, $W^2$, RG, RB, RW, GB, GW, BW; and corresponding third order terms (e.g., $R^2W$, $G^3$, RBG, $B^2G$, etc.), with insignificant terms left out, if desired. The XYZ values predicted by the linear model are converted to $L^*a^*b^*$, and compared with measured $L^*a^*b^*$ values. The processor 16 then employs a statistic involving the difference between measured and computed $L^*a^*b^*$ values as a metric in a non-linear optimization to obtain the best values for the matrix elements.

In scanner characterization, a set of pages containing patches are scanned by the scanner 12 and processed by the processor 16 to obtain patch average values. The same pages are measured using a spectrophotometer. The characterization can be performed one or more times with the same set of scans and measurements to improve accuracy and/or reliability. In a baseline case the W channel can be ignored. In a test case, the W channel can be included in the calculation. In scanner characterization as employed for printer calibration, multiple subspaces of CMYK space are characterized separately, corresponding to specific areas used in printer calibration. In addition to these subspaces, an auxiliary table is built from, for instance, a 6×6×6, a 7×7×7, or other-dimensioned sampling of CMY space, for use as a fall-back when colors outside the gamut of those used to build the subspace-specific characterizations are encountered.

According to an example, the processor 16 employs a polynomial matrix to map data from RGB(W) to XYZ to perform data fitting for characterization; converts XYZ values to $L^*a^*b^*$ analytically, and non-linearly optimizes the matrix to minimize the DE between the input patches and the predicted values. Measured $L^*a^*b^*$ values can thus be converted to XYZ, and a matrix can be computed (e.g., one column at a time if desired) using linear regression to convert from RGB to XYZ (with all significant terms up to cubic). For each predicted XYZ data set, an $L^*a^*b^*$ data set is computed and compared with the measured $L^*a^*b^*$ data set. The coefficients are then optimized using a mathematical solver (e.g., executed by the processor 16) to minimize the root-mean-square DE between the fit and the measurements. Once the best fit coefficients for RGB to XYZ (and hence $L^*a^*b^*$) are found, non-zero coefficients for the significant terms, in this example clear (W), RW, GW, BW and $W^2$ are added and best-fit coefficients found, by running the solver again.

To further this example, an examination of the residuals as a function of W may indicate that the mean residual is approximately twice as large for W in the dark half of the patches used as it is in the light half. To test the approach of splitting color space based on W, one or more additional fits can be performed, following the same procedure as above, but only including the approximately half of the patches that had W≤0.2. Table 1 shows an example of results that may be derived from such tests.

TABLE 1

Root-mean-square fitting errors for CMY patches (on 6 × 6 × 6 grid)

| Method | All 216 patches | Dark 105 patches | Improvement |
|---|---|---|---|
| RGB only | 2.15 | 1.41 | 34% |
| RGBW | 1.36 | 1.06 | 22% |
| Improvement | 37% | 25% | 51% |

With regard to general scanner characterization, while one of the applications of the systems and/or methods described herein is to scanner-based printer calibration, another application is to gray component replacement (GCR)-independent pseudo-colorimetric scanning. According to an example, a set of pages containing $6^4=1296$ patches can be scanned and measured, with CMYK values unknown, in order to quantify the scanner's ability to measure actual reflected color from a fixed paper and CMYK toner set with unconstrained black generation strategy. A cubic matrix can be employed to fit RGB to XYZ, while minimizing error in $L^*a^*b^*$, across all patches. The result may exhibit a root-mean-squared DE from measured-to-fit values of, for instance, 3.11; when terms in clear were added in (e.g., W, RW, GW, BW, $W^2$), the error may drop to, for example, 2.76, for an improvement of 11%.

While high order polynomial matrix fitting is common for scanner characterization, the moving-matrix approach, in which different (typically low order) matrices are used in different regions of color space, is also known as an alternative. One case involves splitting color space, as described above. In this version, color space is divided into non-overlapping regions, each with a corresponding matrix. A scanned color is tested for inclusion in the non-overlapping regions, and the matrix corresponding to the region containing the color is employed. More sophisticated approaches smoothly blend the different regions, using multiple matrices and weighting their results according to the distance between the color and a representative color for each region. According to an example, beginning with the same grid of patches, all those with a W value less than 0.2 can be included in a subset fit. Table 2 shows some exemplary results of such a test.

TABLE 2

Root-mean-square fitting errors for CMYK patches (in a 6 × 6 × 6 × 6 grid)

| Method | All 1296 patches | Darkest 1082 patches | Improvement |
|---|---|---|---|
| RGB only | 3.11 | 3.08 | 1% |
| RGBW | 2.76 | 2.29 | 17% |
| Improvement | 11% | 26% | 26% |

Figure 2:
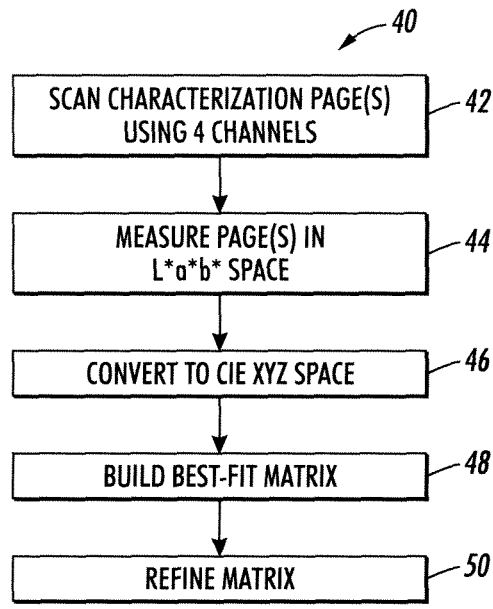
FIG. 2 is an illustration of a method of reducing metamerism in a scanned image for printer calibration and/or measuring printer defects, in accordance with various features described herein.
Figure 3:
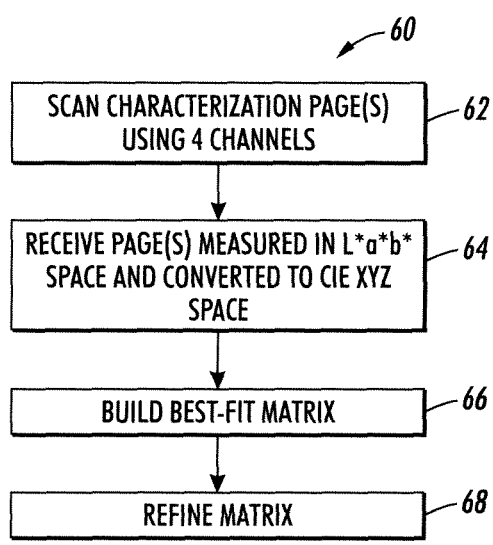
FIG. 3 is an illustration of a method of mitigating metamerism in a scanned image for printer calibration and/or measuring printer defects using pre-converted characterization page measurements, in accordance with various features described herein.
Figure 4:
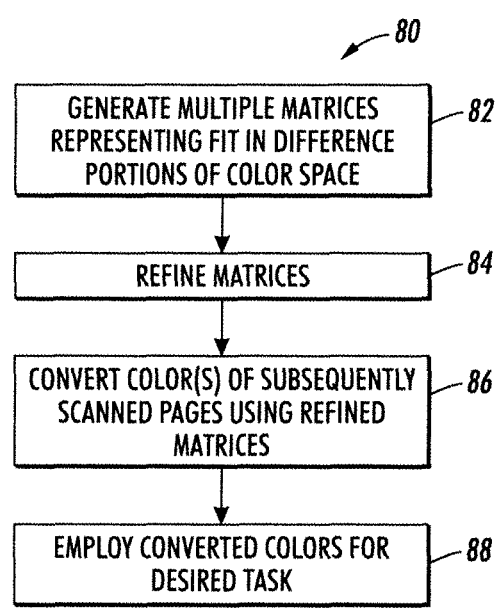
FIG. 4 is an illustration of a method of using filtered and unfiltered information measured from a characterization page to reduce metamerism in a printer or scanner, in accordance with one or more features described herein.

FIGS. 2-4 illustrate one or more methods related to printer and/or scanner calibration, mitigating metamerism, etc., in accordance with various features. While the methods are described as a series of acts, it will be understood that not all acts may be required to achieve the described goals and/or outcomes, and that some acts may, in accordance with certain aspects, be performed in an order different that the specific orders described.

FIG. 2 is an illustration of a method 40 of reducing metamerism in a scanned image for printer calibration and/or measuring printer defects, in accordance with various features described herein. At 42, one or more characterization pages is scanned, using at least four channels, one of which is unfiltered (e.g., RGBW or the like). At 44, the same characterization page(s) is/are measured in L*a*b* space. The L*a*b* space measurements are converted to XYZ space, at 46. L*a*b* values can be converted to corresponding XYZ values using the standard formulas given by, e.g. Digital Color Imaging Handbook, G. Sharma Editor, pp29-30. At 48, a best-fit matrix is generated, which transforms R, G, B, and W data and various powers (e.g., R, $R^2$, $R^3$, G, $G^2$, $G^3$, B, $B^2$, $B^3$, W, $W^2$, $W^3$, etc.) and cross terms (e.g., RGB, RGW, $R^2B$, . . . , etc.) into CIE XYZ values. At 50, the matrix is refined using non-linear optimization to minimize the difference in L*a*b* space between measured values and those converted through the matrix and then converted to L*a*b* using conventional means.

In one example, one or more best-fitting matrices or other parameter sets are computed using only RGB and L*a*b* inputs. For example, in a matrix-based embodiment, only terms involving R, G and B, and not W are included in the initial fit, which is refined using non-linear optimization. Once those terms have been computed, additional terms involving W are added, and the optimization is repeated, using the previously computed solution (e.g., not involving W) as a starting point. In the matrix-based embodiment, terms involving W have zero coefficients at the start of the refinement.

In accordance with other features, the conversion at 46 can employ standard equations. Additionally or alternatively, a measuring device such as calorimetric measurement device(s) 28 can supply both the L*a*b* values and the corresponding XYZ values. The matrix generated at 48 can be built using linear regression, or the method may employ any of a number of techniques or protocols to eliminate or reduce parameters that are insignificant to the fit. According to another aspect, the difference in L*a*b* space determined during matrix refinement at 50 can be a Euclidean distance (also known as DE76), or may use a more sophisticated color difference metric, such as DE94 or DE2000. In addition, a less expensive metric can be used for the earlier iterations of a non-linear optimization method. Moreover, the non-linear optimization employed at 50 can employ quasi-Newton iteration, conjugate gradient descent, or any of the other well-known methods of non-linear optimization.

FIG. 3 is an illustration of a method 60 of mitigating metamerism in a scanned image for printer calibration and/or measuring printer defects using pre-converted characterization page measurements, in accordance with various features described herein. At 62, a characterization page or plurality thereof is scanned using four channels, one of which is unfiltered, such as R, G, and B filtered channels, and an unfiltered clear channel, W. Various image processing functions, such as are described in published U.S. Patent Publication No. 20070002403 are used to convert from the raw, full resolution scanned image to patch averages in RGBW space. At 64, CIE XYZ values for the patches of the characterization page, pre-converted from L*a*b* space measurements thereof, are received. At 66, a best-fit matrix is built, which transforms R, G, B, and W data and various powers (e.g., R, $R^2$, $R^3$, G, $G^2$, $G^3$, B, $B^2$, $B^3$, W, $W^2$, $W^3$, etc.) and cross terms (e.g., RGB, RGW, $R^2B$, . . . , etc.) into CIE XYZ values. At 50, the matrix is refined using non-linear optimization to minimize the difference in L*a*b* space between received values and those converted through the matrix and then converted to L*a*b* using conventional means. Conversion of values via the matrix and/or matrix refinement can be performed as described above with regard to FIG. 2.

FIG. 4 is an illustration of a method 80 of using filtered and unfiltered information measured from a characterization page to reduce metamerism in a printer or scanner, in accordance with one or more features described herein. At 82, multiple matrices are generated, which represent a fit in different portions of color space. Such matrices can be generated by the system 10 and/or using the method(s) described above. The matrices are then refined, at 84. At 86, colors of one or more subsequently scanned pages are converted using the refined matrices. At 88, the converted colors are employed for a desired task, such as printer calibration, measuring printer drift, detecting other print defects, etc.

According to one example, the clear channel values are compared to a predetermined threshold value to determine which matrix to employ for color conversion. For instance, a clear channel value that is less than or equal to the predetermined threshold value can be converted using a first matrix, while a clear channel value that is greater than the predetermined threshold value can be converted using a second matrix. The predetermined value can be indicative of a level of brightness (or darkness). In another example, multiple predetermined threshold levels are employed to delineate multiple ranges of brightness or darkness, and clear channel values that fall into a given range are converted or adjusted using a matrix that corresponds to the given range.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of reducing metamerism in a scanned document, comprising:
    scanning a characterization page using a plurality of filtered channels and an unfiltered channel to generate R, G, B, and W values;
    measuring the characterization page in colorimetric space to generate measured colorimetric values, wherein the measured colorimetric values are L*a*b* values;
    generating best fitting parameters of a conversion function from R, G, B and W values to colorimetric values, wherein generating the best fitting parameters comprises obtaining best-fitting parameters for a conversion to XYZ space; and
    employing the conversion function to convert scanned values from RGBW to XYZ values; and
    converting values from XYZ to predicted L*a*b* values, refining the best-fitting parameters, and minimizing a root-mean-square color distance (DE) between the predicted L*a*b* values and the measured L*a*b* values.

2. The method of claim 1, wherein the conversion function comprises matrix multiplication, employing a best-fit matrix.

3. The method of claim 2, further comprising using non-linear optimization to refine the best-fit matrix, thereby minimizing a difference in L*a*b* space between measured and predicted L*a*b* values.

4. The method of claim 2, wherein the best-fit matrix is a polynomial matrix and is employed to map RGBW values to XYZ space for data fitting and scanner characterization.

5. The method of claim 4, further comprising employing at least one of the following values in the polynomial matrix: W, $W^2$, $W^3$, RGW, RBW, GBW, $R^2W$, $G^2W$, $B^2W$, $W^2R$, $W^2G$, and $W^2B$.

6. The method of claim 1, further comprising optimizing the parameters for RGBW-to-XYZ conversion using parameters optimized for an RGB to XYZ conversion as a starting point.

7. The method of claim 6, further comprising adding zero-coefficients for unfiltered terms to the parameter set, and optimizing the zero-coefficients to obtain non-zero coefficients.

8. The method of claim 7, wherein the unfiltered terms comprise W, RW, GW, BW, and $W^2$.

9. The method of claim 1, further comprising using the refined parameter set to convert one or more colors in subsequent scanned pages.

10. The method of claim 9, further comprising using the converted colors to calibrate a printer.

11. The method of claim 9, further comprising using the converted colors to measure printer drift.

12. A system that facilitates reducing metamerism in electronic documents, comprising:
  a scanner that scans a characterization page to generate RGB values and W values;
  a processor that generates best-fitting parameters of a conversion function for converting the R, G, B and W values to colorimetric values, and employs the conversion function to convert scanned values from RGBW to calorimetric values; and
  a colorimeter that measures L*a*b* values for the characterization page, and wherein the processor generates predicted L*a*b* values from XYZ values using the conversion function, and refines the best-fit parameters to minimize a root-mean-square color distance (DE) between the predicted L*a*b* values and the measured L*a*b* values.

13. The system of claim 12, wherein the processor employs non-linear optimization to refine the matrix and minimizes a difference in L*a*b* space between measured and predicted L*a*b* values, and wherein the best-fit matrix is a polynomial matrix and is employed by the processor to map the RGBW values to XYZ space for data fitting and scanner characterization.

14. The system of claim 12, wherein the processor employs at least one of the following color value and clear value combinations in the polynomial matrix: W, $W^2$, $W^3$, RGW, RBW, GBW, $R^2W$, $B^2W$, $W^2R$, $W^2G$, and $W^2B$.

15. The system of claim 12, further comprising a mathematical solver that optimizes coefficients for conversion to XYZ space in the matrix, wherein the processor adds non-zero coefficients for W values to the matrix, the mathematical solver optimizes the non-zero coefficients, and wherein the processor employs the refined matrix to convert one or more colors in subsequent scanned pages.

16. A printing platform, comprising:
  a scanner that scans a characterization page using a plurality of sensors that generate color values and unfiltered clear values;
  a processor that generates best-fitting parameters of a conversion function for converting R, G, B and W values to colorimetric values, and employs the conversion function to convert scanned RGBW values into colorimetric values;
  a memory that stores at least one lookup table comprising conversion data for converting between L*a*b* space, XYZ space, and color space; and
  a colorimeter that measures L*a*b* values for the characterization page;
  wherein the processor generates predicted L*a*b* values from XYZ values using the conversion function, and refines the best-fit parameters to minimize a root-mean-square color distance (DE) between the predicted L*a*b* values and the measured L*a*b* values; and
  wherein the processor employs a refined matrix to convert one or more colors in a subsequent scanned page, and employs the one or more converted colors to calibrate a printer.

* * * * *